(No Model.)
C. H. COOK.
DETACHABLE BALL BEARING.
No. 548,156. Patented Oct. 15, 1895.
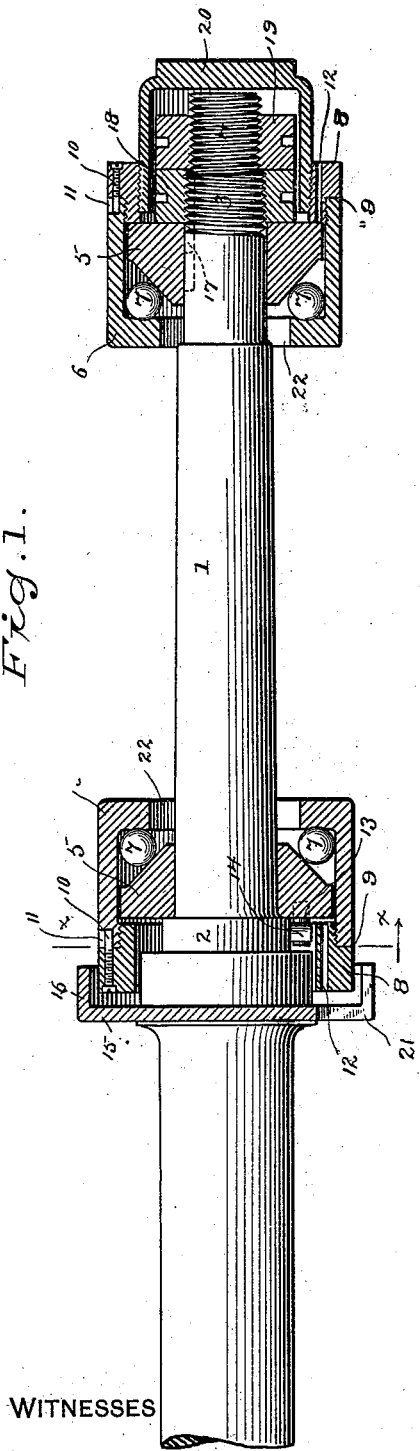
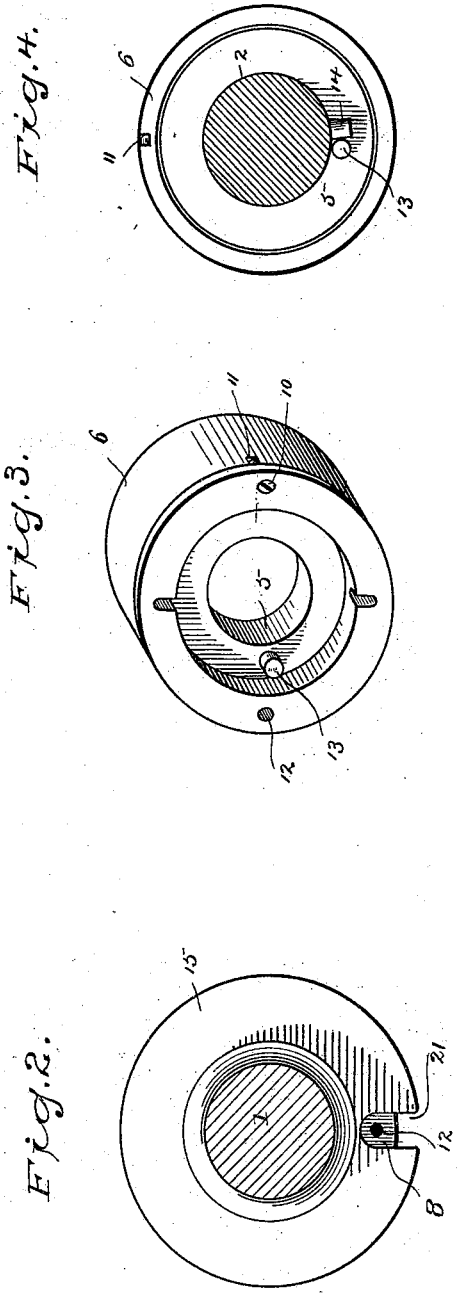
WITNESSES
H. A. Lamb
S. V. Richardson.
INVENTOR
Charles H. Cook
By A. M. Wooster
Atty.

UNITED STATES PATENT OFFICE.

CHARLES H. COOK, OF SOUTH NORWALK, CONNECTICUT, ASSIGNOR, BY MESNE ASSIGNMENTS, TO ALDEN SOLMANS, OF SAME PLACE.

DETACHABLE BALL-BEARING.

SPECIFICATION forming part of Letters Patent No. 548,156, dated October 15, 1895.

Application filed November 12, 1894. Serial No. 528,476. (No model.)

*To all whom it may concern:*

Be it known that I, CHARLES H. COOK, a citizen of the United States, residing at South Norwalk, in the county of Fairfield and State of Connecticut, have invented certain new and useful Improvements in Detachable Ball-Bearings; and I do hereby declare the following to be a full, clear, and exact description of the invention, such as will enable others skilled in the art to which it appertains to make and use the same.

My invention has for its object to produce ball-bearings for vehicle-wheels, which shall be so constructed that the inner and outer bearings shall be wholly independent of each other, and that the bearings may be assembled at the shop and shipped in that condition, it being unnecessary to take the bearings apart in inserting or removing them from a hub, the invention, moreover, being simple, inexpensive, and compact in form, so that no removal of wood from the center of the hub is required, which leaves the hub much stronger than when connecting-bearings are used.

With these ends in view I have devised the novel construction which I will now describe, referring by numbers to the accompanying drawings, forming part of this specification, in which—

Figure 1 is a longitudinal section showing the inner and outer bearings in position on an axle; Fig. 2, an elevation as seen from the left in Fig. 1; Fig. 3, a perspective of one of the bearings ready for shipment or attachment; and Fig. 4 is a section of the axle on the line $x\ x$ in Fig. 1, the sleeve being removed.

1 denotes the axle, which is provided with a collar 2, and at its outer end with reverse threads 3 and 4. Each inner and outer bearing consists of a cone 5, adapted to be held against turning on the axle; a cap 6, having an opening 22, through which the axle passes loosely; a series of balls 7 between the cone and cap, and a sleeve 8, threaded to engage the inner side of the cap, and which acts to retain the parts of the bearing in place for shipment and when the bearing is removed from the axle. The outer ends of the sleeves are of uniform diameter with the caps, shoulders 9 on the sleeves abutting against the ends of the caps. The sleeves 8 have an internal diameter which is less than the internal diameter of the caps 6, and which is also less than the external diameter of the cones 5, loosely inclosed by said caps, and the said sleeves thus serve not only to retain the said cones and the balls within the said caps, but also to hold the cones and caps in proper adjustment relative to each other to prevent the balls from running loose, if other means be not provided for this purpose. The sleeves are locked to the caps after being screwed up to place by means of screw-pins 10, which pass through and engage the outer ends of the sleeves, the unthreaded inner ends of said screw-pins engaging sockets 11 in the outer ends of the caps.

12 denotes oil-holes in the sleeves, through which oil may be applied to the bearings.

I have shown the inner cone as driven up against collar 2 and held against turning on the axle by means of a pin 13 in the cone, which engages a pin 14 in the collar. The inner bearing is made practically waterproof by means of a collar 15 on the axle, which is provided with an inturned flange 16, which passes into a recess in the inner face of the hub. (Not shown.) A recess 21 is provided in this flange and collar to permit water to drain out and also to permit oiling of the bearings when oil-hole 12 is in line with the recess, as in Fig. 1. The outer cone is held against turning on the axle, but left free to move longitudinally thereon by means of a rib 17, which engages a corresponding groove in the axle. (See dotted lines in Fig. 1.) This cone is moved inward to adjust not only the outer bearing, but the inner bearing also, should adjustment become necessary, by means of a nut 18, which engages the inner thread at the outer end of the axle. This nut is locked in position after adjustment by means of a nut 19, which engages the reverse thread at the extreme outer end of the axle. The outer bearing is made absolutely dust-proof and waterproof by means of a cap 20, which is screwed into the sleeve.

Having thus described my invention, I claim—

1. A detachable ball bearing consisting of a cone adapted to be held against rotation on an axle, a cap having a socket 11, a series of balls between said cone and cap, a sleeve threaded to engage the cap, and a screw pin the threaded portion of which passes through the sleeve and the inner end of which engages the socket whereby the sleeve is locked against turning on the cap.

2. A detachable ball bearing consisting of a cone adapted to be held against rotation on an axle but left free to slide thereon, a cap 6 having an opening to receive the axle loosely, a series of balls between said cone and cap, a sleeve threaded to engage the cap, suitable means for moving the cone longitudinally to adjust the bearing and for locking it in position after adjustment, and a cap 20 threaded to engage the sleeve and covering the outer end of the axle whereby the bearing is made dustproof and waterproof.

In testimony whereof I affix my signature in presence of two witnesses.

CHARLES H. COOK.

Witnesses:
JACOB M. LAYTON,
WILFRED BODWELL.